(12) United States Patent
Sharma et al.

(10) Patent No.: US 8,199,438 B2
(45) Date of Patent: Jun. 12, 2012

(54) IN-SITU DYNAMIC PITCH AND ROLL ADJUSTMENT IN HARD DISK DRIVES

(75) Inventors: Vinod Sharma, Altos, CA (US); Hyung Jai Lee, Cupertino, CA (US)

(73) Assignee: Seagate Technology International

( * ) Notice: Subject to any disclaimer, the term of this patent is extended or adjusted under 35 U.S.C. 154(b) by 658 days.

(21) Appl. No.: 12/354,601

(22) Filed: Jan. 15, 2009

(65) Prior Publication Data

US 2010/0177443 A1 Jul. 15, 2010

(51) Int. Cl.
*G11B 21/16* (2006.01)
(52) U.S. Cl. .................. 360/245.3; 360/245; 360/244.9
(58) Field of Classification Search ............... 360/245.3, 360/246.1, 97.02, 77.02, 266.9, 249.4, 244.9
See application file for complete search history.

(56) References Cited

U.S. PATENT DOCUMENTS

| 6,765,765 | B2 | 7/2004 | Bement et al. | |
|---|---|---|---|---|
| 7,420,778 | B2 * | 9/2008 | Sassine et al. | 360/244.9 |
| 2006/0098348 | A1 * | 5/2006 | Yao et al. | 360/294.4 |
| 2008/0002305 | A1 * | 1/2008 | Kwon et al. | 360/294.4 |

* cited by examiner

*Primary Examiner* — Gene Auduong

(57) ABSTRACT

Disclosed is a head gimbal assembly for a hard disk drive that includes a head pivotally connected to a flexure. The flexure has a longitudinal axis. The assembly includes first and second micro-actuators that are located between the flexure and the head and spaced from the longitudinal axis. By way of example, the first and second micro-actuators may be thin piezo-electric transducers. Control signals can be provided to the micro-actuators to vary the pitch and/or roll of the head.

13 Claims, 3 Drawing Sheets

IN-SITU DYNAMIC PITCH AND ROLL ADJUSTMENT IN HARD DISK DRIVES

BACKGROUND OF THE INVENTION

1. Field of the Invention

The present invention relates to controlling a pitch and roll of a head in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

During operation, each head is separated from a corresponding disk surface by an air bearing. The air bearing eliminates mechanical interference between the head and the disks. The strength of the magnetic field from the disk is inversely proportional to the flying height of the head relative to the disk. Reduced spacing results in a stronger magnetic field on the disk, and vice versa.

The flying height is a function of a pitch and roll of the head. It is desirable to control the pitch and roll of the head during operation to insure proper head stability. There have been developed hard disk drives that include micro-actuators to provide micro control of the head flying position. For example, there have been developed head gimbal assemblies that include a ceramic frame that supports the head. Two piezo-electric transducers are attached to the ceramic frame. Excitation of the transducers can cause lateral movement of the head. The range of lateral movement of the head is typically on the order of a few track widths.

BRIEF SUMMARY OF THE INVENTION

A head gimbal assembly for a hard disk drive that includes a head pivotally connected to a flexure. The flexure has a longitudinal axis. The assembly includes first and second micro-actuators that are located between the flexure and the head and spaced from the longitudinal axis.

DETAILED DESCRIPTION

Disclosed is a head gimbal assembly for a hard disk drive that includes a head pivotally connected to a flexure. The flexure has a longitudinal axis. The assembly includes first and second micro-actuators that are located between the flexure and the head and spaced from the longitudinal axis. By way of example, the first and second micro-actuators may be thin piezo-electric transducers. Control signals can be provided to the micro-actuators to vary the pitch and/or roll of the head.

Figure 1:
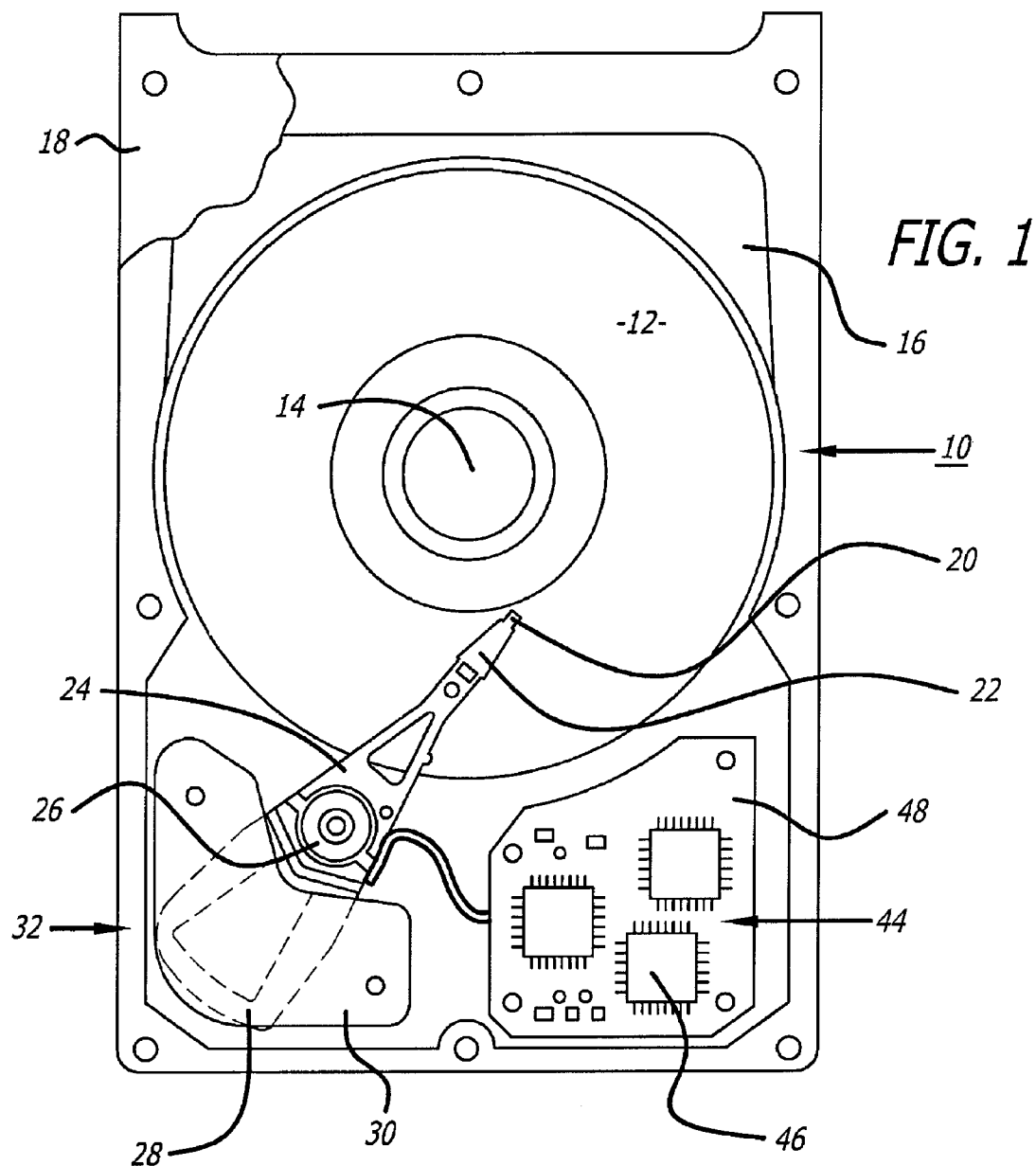
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have a read element (not shown) and a write element (not shown). The write element magnetizes the disk 12 to write data. The read element senses the magnetic fields of the disks 12 to read data. By way of example, the read element may be constructed from a magneto-resistive material that has a resistance which varies linearly with changes in magnetic flux. Each head may include a heater element (not shown). A current can be provided to the heater element to expand the heads and vary the head flying height. These types of heads are commonly referred to as fly-on-demand ("FOD") heads.

Each head 20 may be gimbal mounted to a flexure 22 as part of a head gimbal assembly (HGA). The flexures 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Figure 2:
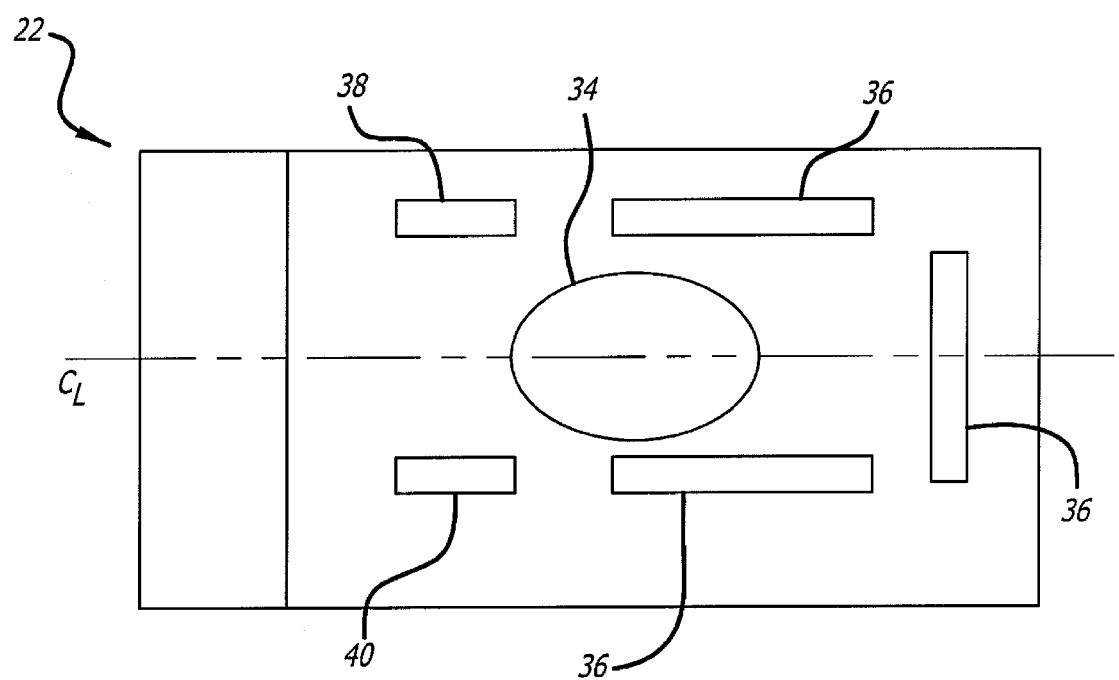
FIG. 2 is an illustration showing a flexure of a head gimbal assembly of the disk drive.

FIG. 2 shows a portion of the flexure 22 that is pivotally connected to a head. The head may be bonded to the flexure 22 by a conductive epoxy 34 or another like attachment element. The flexure 22 may have pads 36 that limit the relative movement between the head and the flexure 22.

The HGA includes a first micro-actuator 38 and a second micro-actuator 40 located between the flexure 22 and the head. By way of example, the first 38 and second 40 micro-actuators may be thin (e.g. 2-5 microns) piezo-electric transducers attached to the flexure 22.

Alternatively, micro-actuators 38 and 40 may be thin film resistive heating elements. The micro-actuators 38 and 40 may be spaced a first distance and a second distance, respectively, from a longitudinal axis $C_L$ of the flexure 22. The first distance may be equal to the second distance. By way of example, the first and second distance may each be 0.3 mm. The sensitivity of dynamic roll with respect to stroke of one of the piezoelectric transducer in this case is about 3.3 micro-radians/nm. The micro-actuators 38 and 40 are also placed at a distance away from the center of the head, along a direction perpendicular to the longitudinal axis $C_L$. By way of example, this distance may also be 0.3 mm for both the micro-actuators. The sensitivity of dynamic pitch with respect to stroke of both of the piezoelectric transducers in this case is about 3.3 micro-radians/nm. Locating the micro-actuators 38 and 40 between the head and flexure increases the stroke sensitivity.

Referring to FIG. 1, the hard disk drive 10 may include a printed circuit board assembly 44 that includes a plurality of integrated circuits 46 coupled to a printed circuit board 48. The printed circuit board 46 is coupled to the voice coil 38, heads 20 and spindle motor 14 by wires (not shown).

Figure 3:
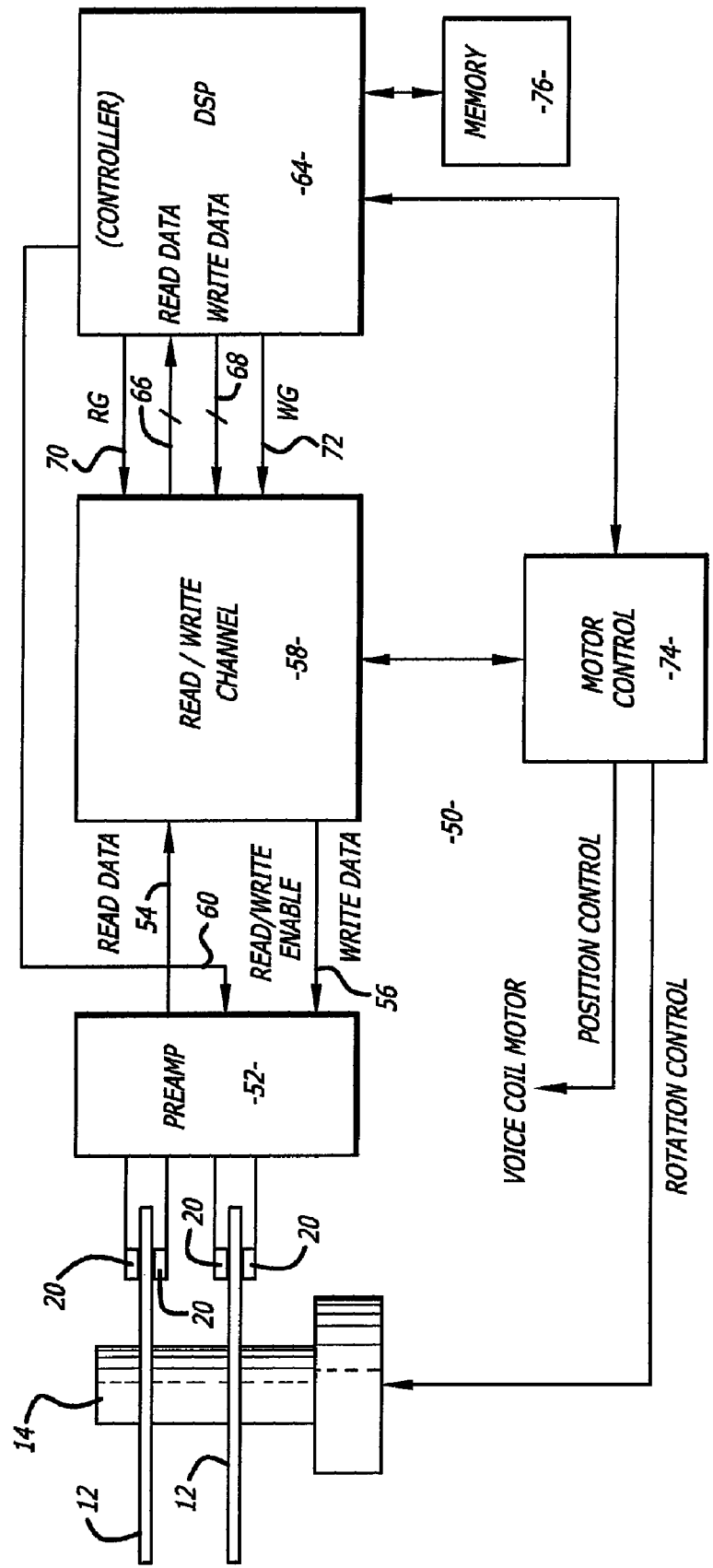
FIG. 3 is a schematic of an electrical circuit for the hard disk drive.

FIG. 3 shows an embodiment of an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

The controller 64 can provide control signals to the micro-actuators 38 and 40 of the head gimbal assemblies to vary different fly characteristics of the heads. For example, a first control signal can be provided to the first micro-actuator 38 and a second control signal can be provided to the second micro-actuator 80 to vary the pitch of the head. If the first signal is different than the second signal then the head roll may also be varied.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A head gimbal assembly for a hard disk drive, comprising:
   a flexure that has a longitudinal axis;
   a head pivotally connected to said flexure;
   a first micro-actuator that is located between said flexure and said head and spaced a first distance from said longitudinal axis; and,
   a second micro-actuator that is located between said flexure and said head and spaced a second distance from said longitudinal axis.

2. The assembly of claim 1, wherein said first and second micro-actuators are each piezo-electric transducers.

3. The assembly of claim 1, wherein said first and second micro-actuators are attached to said flexure.

4. The assembly of claim 1, wherein said first distance is equal to said second distance.

5. A hard disk drive, comprising:
   a disk;
   a spindle motor that rotates said disk;
   a head gimbal assembly that is coupled to said disk, said head gimbal assembly including;
      a flexure that has a longitudinal axis;
      a head pivotally connected to said flexure;
      a first micro-actuator that is located between said flexure and said head and spaced a first distance from said longitudinal axis;
      a second micro-actuator that is located between said flexure and said head and spaced a second distance from said longitudinal axis; and,
   a controller that is coupled to said head and provides control signals to said first and second micro-actuators to control a roll and a pitch of said head.

6. The disk drive of claim 5, wherein said first and second micro-actuators are each piezo-electric transducers.

7. The disk drive of claim 5, wherein said first and second micro-actuators are attached to said flexure.

8. The disk drive of claim 5, wherein said first distance is equal to said second distance.

9. The disk drive of claim 5, wherein said controller provides a first control signal to said first micro-actuator that is different than a second control signal provided to said second micro-actuator.

10. A method for controlling a flying characteristic of a head in a hard disk drive, comprising:
    sending a first control signal to a first micro-actuator located between a flexure and a head; and,
    sending a second control signal to a second micro-actuator located between the flexure and the head.

11. The method of claim 10, wherein the first control signal is different from the second control signal.

12. The method of claim 10, wherein the first and second micro-actuators together move the head to vary a head pitch.

13. The method of claim 10, wherein either the first or the second micro-actuator move the head to vary a head roll.

* * * * *